United States Patent [19]
Ryan et al.

[11] Patent Number: 5,581,951
[45] Date of Patent: Dec. 10, 1996

[54] RAIL CAR CROWN GASKET

[75] Inventors: Samuel Ryan; Dean Kyriakou, both of Mercer, Pa.

[73] Assignee: Pennsylvania Rail Car Company, Mercer, Pa.

[21] Appl. No.: 502,129

[22] Filed: Jul. 13, 1995

[51] Int. Cl.$^6$ .................... E06B 7/22; E06B 7/23
[52] U.S. Cl. ........................... 49/498.1; 49/489.1
[58] Field of Search ................. 49/498.1, 489.1, 49/493.1, 495.1

[56] References Cited

U.S. PATENT DOCUMENTS

| | | |
|---|---|---|
| 2,263,806 | 12/1941 | Hammerl ........................ 49/498.1 |
| 2,640,230 | 6/1953 | Eck et al. . |
| 2,907,080 | 10/1959 | Beauchamp et al. . |
| 2,935,771 | 5/1960 | Hatcher ........................... 49/495.1 |
| 3,226,780 | 1/1966 | Landis . |
| 3,371,445 | 3/1968 | Herr et al. . |
| 3,452,481 | 7/1969 | Bailey ............................. 49/498.1 |
| 3,562,957 | 2/1971 | Landis . |
| 4,010,573 | 3/1977 | Andrzejewski ................ 48/498.1 |
| 4,255,903 | 3/1981 | Reynolds et al. ............... 49/498.1 |
| 5,148,643 | 9/1992 | Sampson et al. ............... 49/495.1 |

*Primary Examiner*—Kenneth J. Dorner
*Assistant Examiner*—Curtis A. Cohen
*Attorney, Agent, or Firm*—Harpman & Harpman

[57] ABSTRACT

A rail car crown gasket for rail cars to provide a continuous seal between railroad box car doors and the rail car. The rail car door gasket is of a continuous elongated construction that is secured into a gasket mounting channel in the rail car doors.

5 Claims, 2 Drawing Sheets

RAIL CAR CROWN GASKET

BACKGROUND OF THE INVENTION

1. Technical Field

This invention relates to rail cars of the type with main and auxiliary sliding car doors that utilize perimeter rubber sealing gaskets. The sliding car doors close over one another along central vertical adjacent edges. Typically, the main door has a continuous tubular gasket around its perimeter recess surface facing the rail car opening. The auxiliary door has a tubular gasket around three of its perimeter recess edges facing the rail car.

2. Description of Prior Art

Prior art devices of this type have been directed to existing rail car door gasket arrangements in which one-piece tubular gaskets are secured within recessed perimeter edges of the rail car doors, see for example U.S. Pat. Nos. 2,640,230, 2,907,080, 3,226,780, 3,371,445, 3,452,481 and 3,562,957.

U.S. Pat. No. 2,640,230 is directed to a cabinet door gasket structure having a gasket configuration. U.S. Pat. No. 2,907,080 discloses a sealing means for rail car doors with a sealing gasket having arcuate body member with multiple ribs and base engagement portions thereon. A flange extends from one base portion for mounting same.

U.S. Pat. No. 3,226,780 shows a sealing gasket for a rail car having a plurality of ribs along its upper surface. A central rib has multiple engagement ribs extending therefrom.

In U.S. Pat. No. 3,371,445 a door gasket can be seen wherein a gasket engagement portion has three upstanding enlarged ribs thereon all of equal size and height.

U.S. Pat. No. 3,452,481 defines a door sealing arrangement having a door gasket with multiple ribs and a dual pedestal base portion.

Finally, U.S. Pat. No. 3,562,957 is directed to a closure sealing apparatus for railway cars in which a half-arcuate resilient gasket is formed from a contoured resilient member. A mounting bracket is utilized to hold the two opposing parallel edges of the resilient member to form the half-arcuate upstanding hollow gasket configuration which is typically found in rail car applications.

Applicant's invention is directed towards a rail car door gasket which is used to achieved a seal between the rail car doors and the rail car and each other by overlapping auxiliary and main rail car doors. The railroad car door gasket is of a typically tubular gasket configuration with unique integral oppositely disposed additional sealing flanges which provides along with typical upstanding ribs a sealing surface on the rail car doors.

SUMMARY OF THE INVENTION

A rail car door crown gasket to provide a continuous sealing engagement between railroad main and auxiliary doors and the rail car. The gasket has a pair of unique auxiliary sealing flanges and sidewall configurations that augment the sealing relationship of the gasket during compression stabilizing and maintaining a superior seal around the doors of the rail car and the overlapping door area sealing same.

DESCRIPTION OF THE PREFERRED EMBODIMENT

Figure 1:
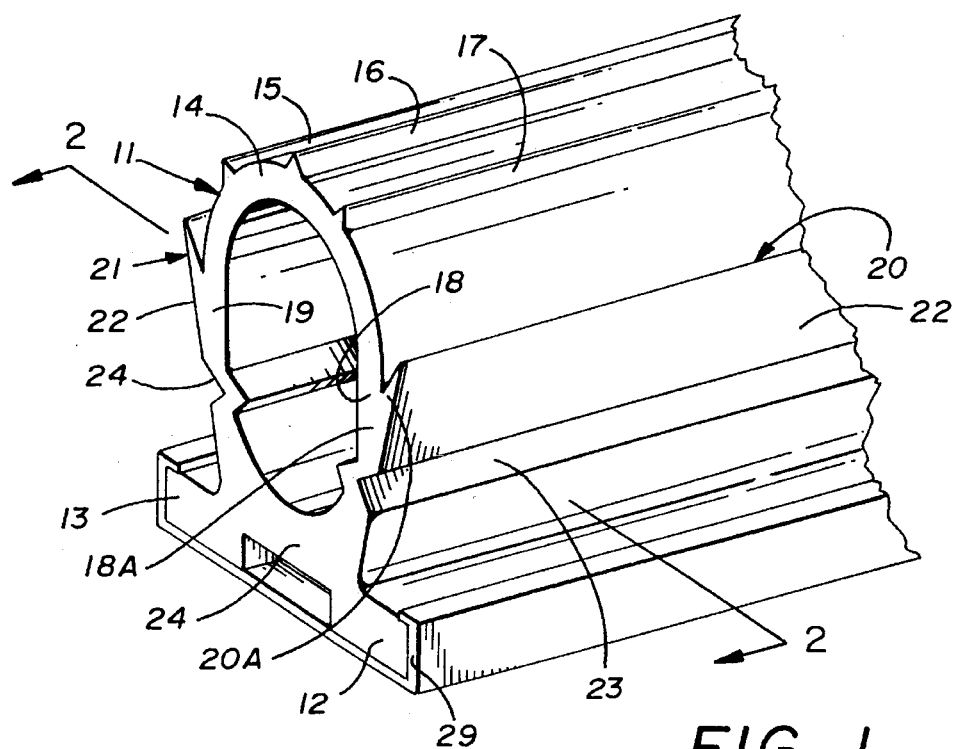
FIG. 1 is a perspective view of a section of the rail car gasket.
Figure 2:
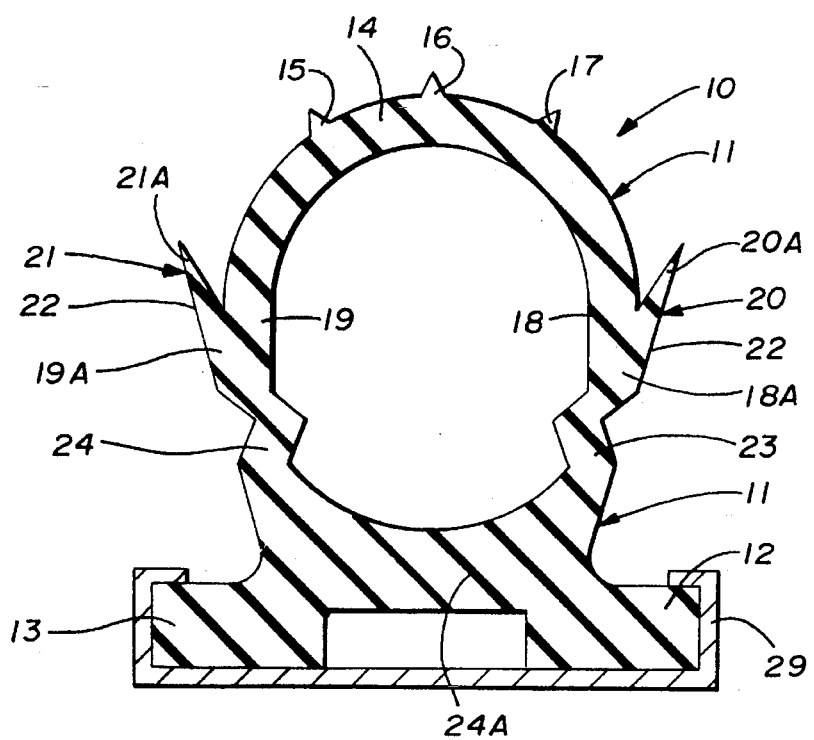
FIG. 2 is a cross section on lines 2—2 of FIG. 1.

Referring to FIGS. 1 and 2 of the drawings, a rail car door gasket 10 can be seen formed of a molded one-piece construction of resilient gasket material comprising a gasket body portion 11 with oppositely disposed out-turned angular flanges 12 and 13 formed integrally thereon. The out-turned angular flanges 12 and 13 defining elongated parallel mounting surfaces for the rail car gasket as will be explained in greater detail hereinafter.

The gasket body portion 11 is of a generally elongated configuration having an upstanding continuous arcuate wall 14 in an inverted U-shaped position. The wall 14 is of an equal transverse thickness with a plurality of elongated sealing ribs 15, 16, and 17 in arcuate spaced parallel relationship to one another on its surface. Each of the ribs 15–17 has opposing tapered sides and extends along the longitudinal axis of the body portion 11.

A pair of oppositely disposed sidewalls 18 and 19 extend downwardly from and are integral with said arcuate wall 14 as best seen in FIG. 2 of the drawings. Each of said walls, 18 and 19 have an area of increased transverse dimension at 18A and 19A defined by respective sealing flanges 20 and 21 that extend outwardly and upwardly therefrom.

The sealing flanges 20 and 21 have respective tapered end portions 20A and 21A with angularly disposed outer surfaces at 22.

The sidewalls 18 and 19 have angularly inwardly extending angularly offset portions 23 and 24 below said sealing flanges that terminate in an integral elongated base portion 24A from which extend the hereinbefore described out-turned flanges 12 and 13.

Figure 3:
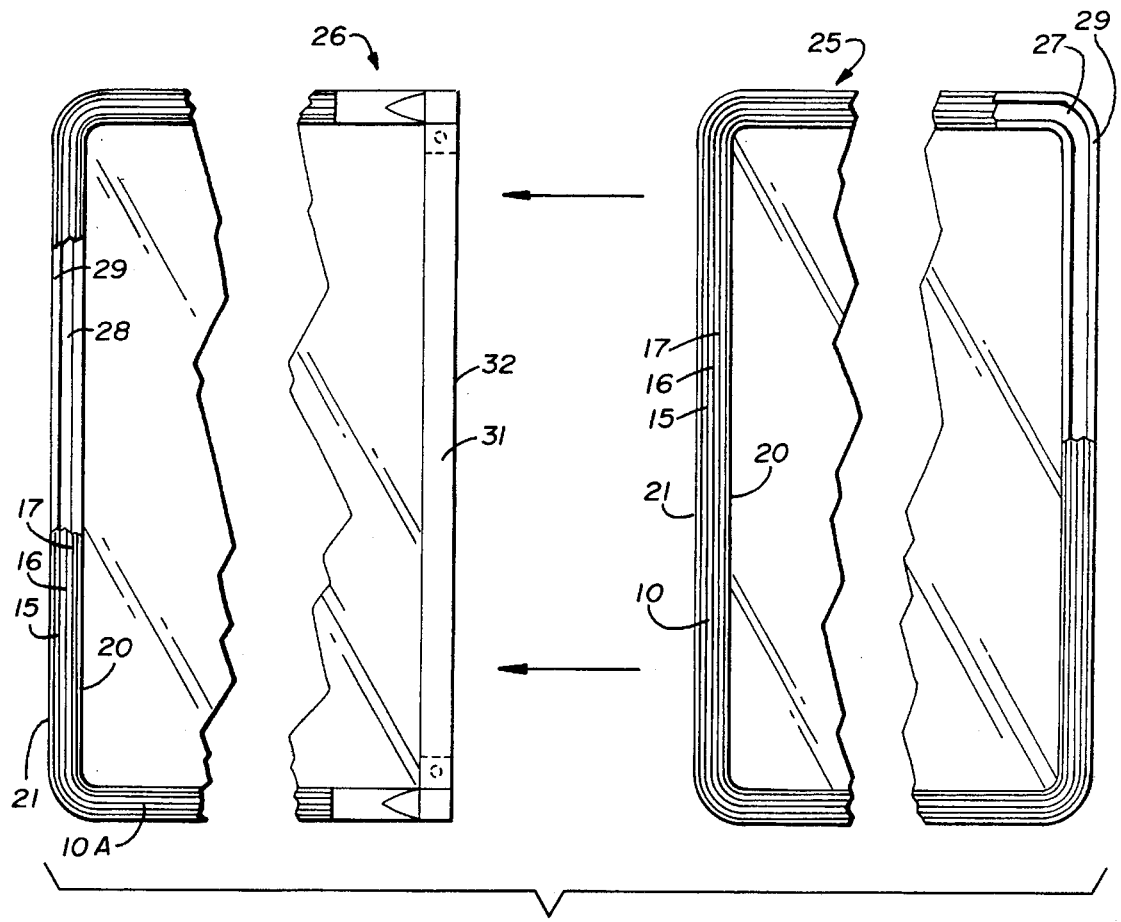
FIG. 3 is a graphic representation of a portion of the rail car doors without the rail car having the gasket installed thereon prior to closing.

Referring now to FIG. 3 of the drawings, portions of a rail car main door 25, an auxiliary door 26 can be seen in which the main door 25 has a perimeter recess gasket mounting area at 27 with the four-sided tubular sealing gasket 10 of the invention therein. The auxiliary door 26 has a recess gasket mounting area at 28 with a respective three-sided tubular sealing gasket 10A therein.

In operation, the railroad car gaskets 10 and 10A are respectively secured to opposing auxiliary door recess mounting area 27 and main door recess mounting area 28 by a generally U-shaped mounting channel 29 (best seen in FIGS. 1 and 4 of the drawings) within the respective door recessed areas 27 and 28.

Figure 4:
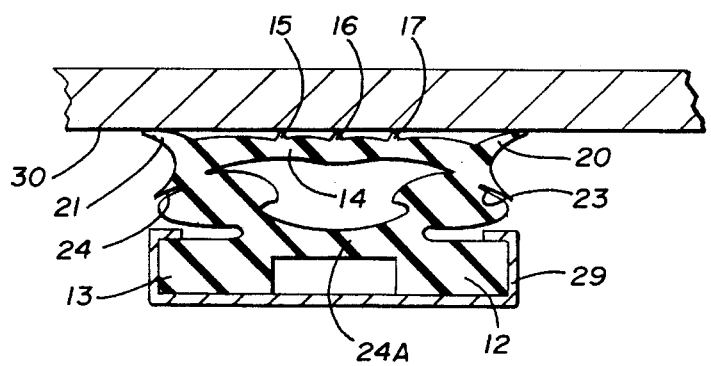
FIG. 4 is a cross-sectional view of the rail car gasket in compression position as in operation.

Referring specifically to FIG. 4 of the drawings, the rail car gasket 10 of the invention is illustrated under compression by a surface 30. During engagement and door closure the rail car gasket 10 seals against the abutting surface 30 by the compression i.e. deflection of the upper arcuate wall 14 with its extended sealing flanges 15–17. The sidewalls inwardly angularly offset portions 23 and 24 support the sidewalls 18 and 19, and direct the sidewalls 18 and 19 deflection inwardly under compression so that the respective out-turned sealing flanges 20 and 21 will align and sealingly engage the abutting surface enhancing the gasket's overall sealing ability which may be compromised by use, wear or irregular engagement surfaces that may be present. The increased transitional thickness of the sidewalls respectively help stabilize the walls 18 and 19's deflection during compression assuring a superior seal.

It will be evident from the above description that a portion of the main door's gasket 10 will overlap and compress against an exposed portion of a sealing door flange 31 extending from the auxiliary door 26 edge portion at 32. The auxiliary gasket 10A on the auxiliary door 26 will correspondingly be compressed upon closure of same against the rail car 30 in a sealing configuration illustrated in FIG. 4 of the drawings.

Thus having illustrated and described my invention it will be apparent to those skilled in the art that various changes and modifications may be made therein without departing from the spirit of the invention.

Therefore we claim:

1. A rail car door gasket for use on rail cars having a main door and an auxiliary door in an aligned overlapping relation said car door gasket comprises; a one-piece elongated tubular body member of resilient composition gasket material, said car door gasket defining an arcuate wall portion with opposing integral sidewalls extending therefrom, an elongated base portion having opposing integral flanges extending outwardly therefrom, multiple sealing ribs on said arcuate wall portion, oppositely disposed sealing flanges extending outwardly from said sidewalls, said sealing flanges having a first portion and a second portion, oppositely disposed vertically offset in-turned angular areas below said sealing flanges, and means for mounting said gasket in car door recess areas.

2. The rail car door gasket of claim 1 wherein said multiple sealing ribs comprise elongated longitudinally extending raised rib elements, said rib element having opposing tapered surface extending from said arcuate wall portion.

3. The rail car door gasket of claim 1 wherein said angularly disposed sealing flanges first portion being tapered and of a known length, said second portion defining an area of increased transverse wall thickness greater than that of said first portion's known length.

4. The rail car door gasket of claim 3 wherein said sealing flange's first and second portion has an angular out-turned surface.

5. The rail car door gasket of claim 1 wherein said means for mounting said gasket in said car door recess area comprises a mounting flange engageable on said respective opposing integral flanges.

\* \* \* \* \*